United States Patent [19]
Penders

[11] 3,922,189
[45] Nov. 25, 1975

[54] DRYING OF LIQUIFORM MATERIALS

[76] Inventor: Hubertus Carolus Marie Penders, 195 Statensingel, Naastricht, Netherlands

[22] Filed: July 29, 1974

[21] Appl. No.: 492,736

Related U.S. Application Data

[63] Continuation of Ser. No. 288,729, Sept. 13, 1972, abandoned.

[30] Foreign Application Priority Data
Sept. 13, 1971 Netherlands .................... 7112548

[52] U.S. Cl. ............... 159/4 A; 159/4 B; 159/4 CC; 159/DIG. 6; 159/DIG. 1; 159/DIG. 28; 159/48 R
[51] Int. Cl.² ........................ B01D 1/16; F26B 3/12
[58] Field of Search ........ 159/4 A, 48 R, 4 CC, 4 B, 159/4 ST, DIG. 6, DIG. 28; 122/356

[56] References Cited
UNITED STATES PATENTS

| | | | |
|---|---|---|---|
| 1,133,051 | 3/1915 | Mevrell | 159/4 ST |
| 1,374,555 | 4/1921 | Dick | 159/4 R |
| 1,771,829 | 7/1930 | Wagner | 159/4 A |
| 1,985,987 | 1/1935 | Hall | 159/4 CC |
| 2,644,516 | 7/1953 | Brendel | 159/4 A |
| 2,829,710 | 4/1958 | Paasch | 159/4 R |
| 2,842,193 | 7/1958 | Ballestra | 159/4 CC |
| 2,953,457 | 9/1960 | Sanna | 159/4 R |
| 3,130,225 | 4/1964 | Friend | 159/4 CC |
| 3,236,285 | 2/1966 | Mee et al. | 159/4 D |
| 3,353,920 | 11/1967 | Kitzen | 122/356 X |
| 3,415,665 | 12/1968 | Hussman | 159/48 R |

*Primary Examiner*—Jack Sofer
*Attorney, Agent, or Firm*—Mason, Mason & Albright

[57] ABSTRACT

A drying device comprises a drying space into which liquiform material is sprayed. The drying space is defined by an annular porous wall surrounded by supply chambers for drying gas. The gas supply into the supply chambers is controlled and the wall can incorporate heating elements or the gas can be burnt in the inner surface of the wall.

17 Claims, 1 Drawing Figure

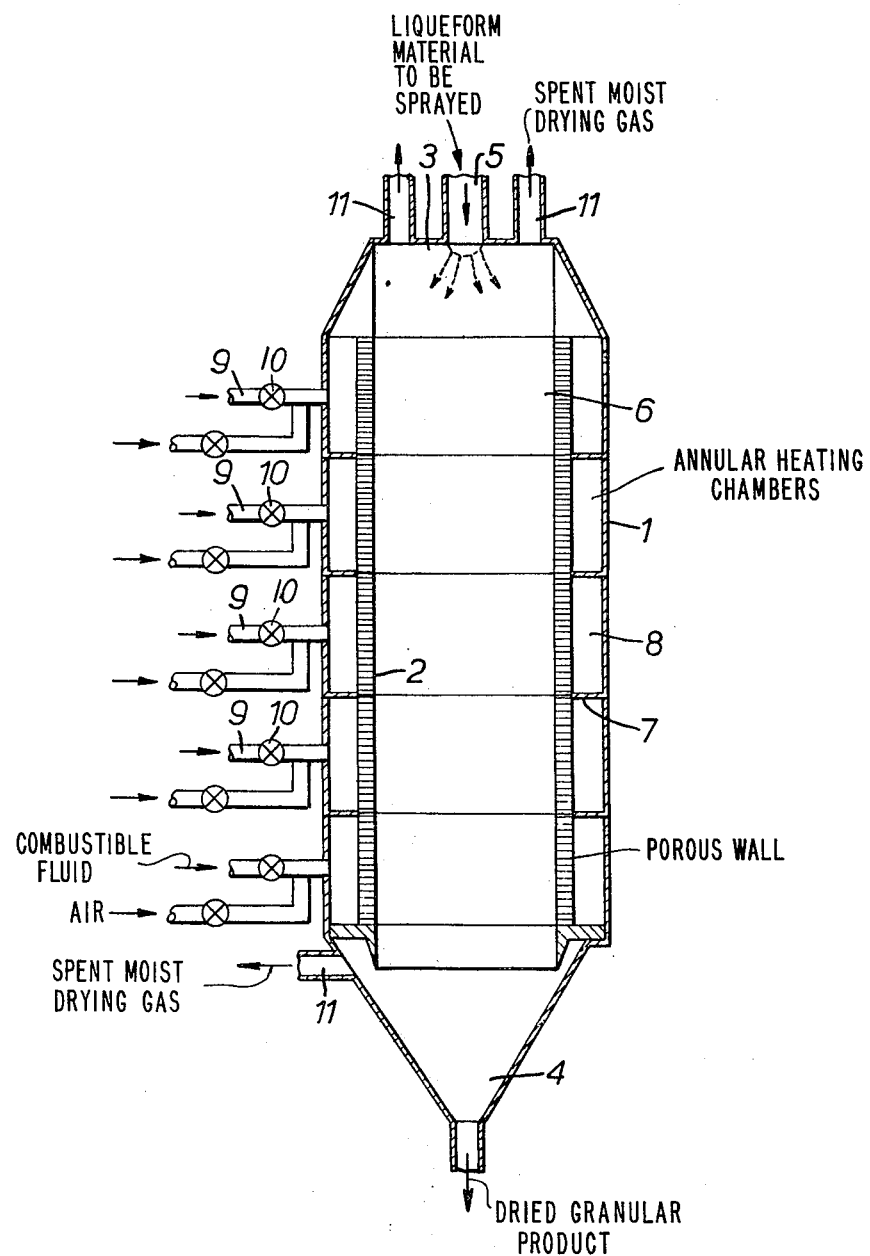

DRYING OF LIQUIFORM MATERIALS

This application is a continuation of application Ser. No. 288,729 filed 9-13-72, now abandoned.

BACKGROUND OF THE INVENTION

1. Field of the Invention

The invention relates to the drying of granular material which is initially received as a liquiform material.

2. Description of the Prior Art

In preparing granular material, in particular when starting from a material suspended in a liquid, for example clay-like materials suspended in water and serving as a raw material for forming ceramics, drying devices in the form of drying towers are used. Such a drying tower comprises a drying space with a vertical longitudinal axis, which is provided with an element for spraying the suspension into the drying space. At the same time hot air or other drying gas is introduced into this space, and is mixed as thoroughly as possible with the sprayed material, in order to take up the moisture therefrom. The dried material is then collected in the form of fine granules in collecting means communicating with the lower end of the drying space, and the moist air is continuously discharged from this space.

Previously proposed drying towers have either downwardly or upwardly directed spray nozzles, with either downwardly or upwardly directed air flows, and with either the same or opposite flow sense of the sprayed material and the air flow (parallel or counter current). The structure of the device depends for example on the character of the material and on the desired degree of drying.

In order to obtain effective drying and sufficient capacity, the previously proposed drying towers are relatively large. This makes the erection of such a drying tower often very objectionable and in any case very expensive, particularly when such a drying device is to be erected in an existing factory space.

An object of the invention is to provide a drying device having reduced dimensions for the same drying effect.

SUMMARY OF THE INVENTION

The invention is based on the consideration that, when, in the previously proposed devices, the location of the spray nozzle and the drying gas supply is fixed, and a certain desired yield is given, the drying effect can only be influenced by varying the temperature and velocity of the drying gas at the supply end, whereas, furthermore, the temperature of this gas is often limited by the character of the material to be dried and the structure of the device. It is, in such devices, not possible to adapt the temperature and moisture content to a desired ideal pattern longitudinally along the contact path with the sprayed material.

The method according to the invention is characterised by directly influencing or regulating the drying process within the drying space, and for this purpose, drying gas is introduced into the drying space substantially transversely to the sprayed suspension, which introduction may be locally adpated to the drying effect; alternatively, or in addition, heat can be supplied to the drying space and can be locally adapted to the drying effect, for instance by heating the transversely introduced drying gas and/or by accomplishing a direct heat transfer to the sprayed material by means of radiant heat.

A drying device for carrying out this method can comprise a boundary wall which defines the drying space and which, at least for a substantial part, is permeable to the drying gas, which wall is surrounded by one or more supply chambers, the drying gas supply being adjustable in such a manner that the amount of gas flowing through the wall into the drying space is, or can be made, different in different wall portions. Furthermore, means can be provided for heating the drying gas, which are, in particular, included in the boundary wall of the drying space. The heating means can be divided into separately controllable groups and it is also possible to use only such heating means. More particularly these heating means are, at least partially, arranged to heat the portion of the wall in question so that the heat transfer towards the material to be dried is accomplished for a substantial part by radiant heat directed towards the interior of the drying space.

BRIEF DESCRIPTION OF THE DRAWINGS

The invention will now be described, by way of example only, with reference to the accompanying diagrammatic drawing, the sole FIGURE of which is a section of a drying device according to the invention.

DESCRIPTION OF THE PREFERRED EMBODIMENT

The drying device shown comprises a cylindrical outer wall 1 and a coaxial inner wall 2, an upper end wall 3, a discharge hopper 4 extending from the lower end of the outer wall 1, and a spray-nozzle 5, for the material to be dried, mounted in the upper end wall 3; the inner wall 2, the upper end wall 3 and the hopper 4 define a drying space 6, within which the material to be dried can be brought into contact with a heated drying gas.

The space between the walls 1 and 2 is divided by means of horizontal partitions 7 into a number of annular chambers 8. The wall 2 consists, at least for the greater part, of a heat-resistant material which is permeable to the drying gas, and which has such a structure that when a combustible gas mixture is supplied to the chambers 8, combustion can take place in the pores of the material adjacent the boundary surface of the space 6; in particular, the material of the wall 2 may glow in such a manner that a substantial part of the heat is emitted as radiant heat. The combustion is, moreover, complete, so that the hot combustion air as the case may be, can be used as a drying gas.

The chambers 8 each communicate with a respective supply duct 9, which can be provided with a control valve 10 for supplying a combustible gas mixture, if combustion is to occur in the adjacent portion of the wall 2.

In the lower part of the device, near the hopper 4, it may be desirable to effect a certain cooling of the dried material, and this can be effected by supplying only cold air to the appropriate chambers 8. The supply ducts 9 for supplying a combustible mixture are provided with suitable auxiliary means which are known per se for obtaining such a mixture, and in particular, the fuel-air ratio can be varied. With the aid of these various control means the temperature of the combustion gases and also the temperature of the wall parts in question, and, thus, the direct heat transfer by radiation, can be adjusted. In this manner, the drying temperature, the drying gas supply, and the direct heat transfer by radiation to the material to be dried, can be regulated as desired in each annular chamber 8. The division into the chambers 8 depends, of course, on the need of such separate regions.

The drying gas, including the combustion gases, passed through the wall 2 mixes with the material sprayed by the nozzle 5, and is discharged by means of discharge ducts 11. These ducts are shown as lying in the upper wall 3 and the hopper 4, but can also be provided at other suitable positions. These ducts can lead to heat exchangers in which heat is transferred from the discharged moist drying gas to the supplied drying gas; these heat exchangers can, for instance, be arranged in the extreme part of the space between the walls 1 and 2.

Instead of, or in addition to, the spray nozzle 5, an upwardly directed spray nozzle can be used in the lower part of the space 6. It is also possible to use an annular spray assembly for obtaining a substantially annular spraying region. If, necessary, additional drying gas can be blown into the core of this region, which is, also possible in the case of a singular spray nozzle.

The embodiment shown is advantageous that the heated wall 2 is insulated on the outside by the supply chambers 8, and the outwardly-directed heat transfer can be utilized for the greater part, to preheat the combustible mixture. In this case it is not necessary to provide the outer wall 1 with an insulating layer which would increase the dimensions and weight of the device.

The temperature and supply of the drying gas can be controlled in such a manner that the length of the contact path between the drying gas and the material to be dried can be substantially reduced in relation to that of previously proposed devices of similar capacity so that the height of the device will be less. Furthermore space will be saved in that, since the wall 2 itself serves as a heat source, external heating devices are not necessary. In contradistinction to the previously proposed devices in which the temperature and moisture content of the drying gas, which is fed longitudinally through the drying space, varies gradually, and, therefore, is not kept at their ideal values at all points, and approximation of the most effective distribution of these factors is possible in the device shown, with approximation depends on the number of chambers 8 which allow separate adjustment of these factors.

The embodiment shown will preferably be used when a gaseous fuel is the most suitable one. The advantage thereof is that the combustion gases themselves may be used as drying gas, since such gases may be completely burned to carbon dioxide and water vapour, which combustion products are generally not harmful for the material to be dried.

If, on the other hand, hot gases are available, such gases can be supplied directly to the chambers 8 without additional combustion taking place in the pores of the wall 2. When the temperature of these gases is relatively low, the loss of a substantial radiation effect should, then, be taken into account. In that case an apertured wall can be used, and, if required, a fixed flow distribution can be obtained by using openings in the wall 2 with a different size or density in different portions of the wall, and the partitions 7 can then be omitted if desired. Such an arrangement is, of course, also possible when external heating means are used for the drying gas.

It is also possible to form the wall 2 from a heat-resistant material which is either porous or is provided with suitable apertures, and to include electrical heating elements in the wall 2. The operation of the device is in this case substantially the same as that of the device shown, except that no combustible mixture is supplied to the chambers 8. These electrical heating elements can be connected in groups in order to enable a separate temperature control in the various regions of the device.

When the combustion gases are noxious to the material to be dried, or when an available fuel is, for other reasons, not suitable for direction combustion in a porous wall, the wall 2 can be provided with heat-exchange tubes, which can be divided into groups for bringing about a desired temperature distribution. These tubes can be provided with burners, or can communicate with one or more combustion chambers for the fuel in question. Such a construction is also possible when hot gases are available which cannot be used as a drying gas. It is also possible to omit the wall 2, and to space the tubes by a relatively small distance, the spaces between these tubes allowing the drying gas to pass from the chambers 8; these tubes can be provided, if necessary, with heat-exchange ribs. It is, of course, also possible to use a non-heated drying gas, in which case a simple apertured wall 2 without additional heating means is sufficient.

On the other hand it is also possible to use an impermeable wall, and to supply the drying gas axially into the space 6, the wall 2 then being used solely as a source of radiant heat to obtain the desired control of drying. The wall 2 can be heated e.g. by external burners, electrical heating elements, heat exchange tubes or other heating means.

By suitably selecting the drying gas, the material may be additionally influenced, e.g. by influencing the acidity, by a reducing or oxidising action, or the like. suitable for direct combustion in a porous wall, the wall 2 can be provided with heat-exchange tubes, which can be divided into groups for bringing about a desired temperature distribution. These tubes can be provided with burners, or can communicate with one or more combustion chambers for the fuel in question. Such a construction is also possible when hot gases are available which cannot be used as a drying gas. It is also possible to omit the wall 2, and to space the tubes by a relatively small distance, the spaces between these tubes allowing the drying gas to pass from the chambers 8; these tubes can be provided, if necessary, with heat-exchange ribs. It is, of course, also possible to use a non-heated drying gas, in which case a simple apertured wall 2 without additional heating means is sufficient.

On the other hand it is also possible to use an impermeable wall, and to supply the drying gas axially into the space 6, the wall 2 then being used solely as a source of radiant heat to obtain the desired control of drying. The wall 2 can be heated e.g. by external burners, electrical heating elements, heat exchange tubes or oother heating means.

By suitably selecting the drying gas, the material may be additionally influenced, e.g. by influencing the acidity, by a reducing or oxidising action, or the like.

What is claimed is:

1. A method of drying liquiform material comprising the steps of providing cylindrical porous wall means to define a drying space therewithin, providing a plurality of separate, axially contiguous, annular gas supply chambers substantially surrounding the porous wall means, to divide the space into a plurality of axially distributed and substantially contiguous drying zones, feeding the liqueform material axially into the drying space, feeding a combustible gas into at least some of the gas supply chambers, controlling the supply of gas to each chamber independently, burning the gas within the pores of the wall means to heat the wall means, feeding the gas from the wall means centripetally into the associated drying zone transversely to the axis of the drying space with the gas distributed uniformly and peripherally around the wall portion of the drying zone, withdrawing the gas from at least one end portion of the drying space and removing dried granular product from the lower end of the drying space.

2. A method as claimed in claim 1 comprising the steps of forming the gas by mixing air and a combustible fuel and controlling the temperature in each drying zone independently by varying the air/fuel ratio in the gas supplied to the respective gas supply chambers.

3. A method as claimed in claim 1 comprising the step of heating the wall means to emit radiant heat.

4. A method as claimed in claim 1 comprising the step of varying the porosity of different sections of the wall means.

5. A method of drying liquiform material comprising the steps of feeding the material axially into a cylindrical drying space defined by porous wall means and at least a major portion of which is divided into a plurality of axially distributed and substantially contiguous drying zones by means of a plurality of separate, contiguous, annular gas supply chambers, feeding gas into each drying zone via the associated gas supply chamber through the porous wall means whereby to permit individual control of the gas supply and temperature in each zone, the gas being fed into each drying zone transversely to the axis of the drying space and being distributed uniformly around the wall portion of the drying zone, withdrawing the gas from at least one end portion of the drying space and withdrawing dried granular product at the lower end of the drying space.

6. A method as claimed in claim 5, further comprising the step of heating the wall portions of the drying zone whereby to heat the drying gas.

7. A method as claimed in claim 6 wherein the wall means is heated by burning a combustible gas mixture in the pores of the wall, the combustion products being used to form at least a part of the drying gas.

8. A method as claimed in claim 6 in which the wall portions of at least some of the drying zones are heated such that the wall portions emit radiant heat.

9. A method as claimed in claim 8 wherein the wall is heated by burning a combustible gas mixture in the pores of the wall, the combustion products being used to form at least a part of the drying gas.

10. In a drying device
means defining a vertical, cylindrical drying space having a substantially vertical axis, said means comprising
a plurality of separate elements each said element including
an inner porous annular wall, and
an outer annular wall spaced from the inner wall to define therewith an annular chamber, said elements being stacked vertically in contiguous relationship with said inner annular walls collectively defining the drying space,
annular transverse wall means axially separating each said chamber from the adjacent chamber,
means feeding liquiform material to be dried axially into the upper end of the drying space,
means feeding drying gas into each said chamber, said gas being distributed uniformly around each chamber, and passing through the inner porous wall into the drying space transversely to the axis thereof,
separate gas control means associated with each chamber to permit control of the gas supply to each chamber independently,
means defining an outlet for the drying gas at one end of the drying space and means defining a dried granular product outlet at the lower end of the drying space.

11. A drying device according to claim 10, wherein the gas is a mixture composed of air and fuel and said gas control means controls the air/fuel ratio.

12. A drying device according to claim 10, wherein porosities of the inner walls of the respective elements are different.

13. A drying device comprising
wall means defining a cylindrical drying space,
means dividing at least a major portion of the space into a plurality of axially distributed and substantially contiguous drying zones, said means comprising
a plurality of separate, contiguous, annular gas supply chambers operative to feed gas into each drying zone transversely to its longitudinal axis with the gas being uniformly distributed around the wall means,
separate control means controlling the gas supply to each chamber whereby to permit separate control of the temperature in each zone,
means operative to feed material to be dried axially into the drying space, and
means defining an outlet for the drying gas at least at one end portion of the drying space.

14. A device as claimed in claim 13 further comprising means operative to heat the wall means.

15. A device as claimed in claim 13 wherein at least part of the wall means is porous.

16. A device as claimed in claim 13 wherein the wall means comprises,
a plurality of annular wall elements, each said wall element comprising,
an inner wall portion, and
means defining a gas supply chamber surrounding the inner wall portion, said gas supply chamber constituting said supply means.

17. A device as claimed in claim 16, further comprising
separate control means for controlling the gas supply to each gas supply chamber.

* * * * *